United States Patent
Eberhardt, Jr. et al.

(10) Patent No.: US 8,432,567 B2
(45) Date of Patent: Apr. 30, 2013

(54) PRINTER AND SCALE FOR HANDLING RFID LABELS

(75) Inventors: Mark E. Eberhardt, Jr., Troy, OH (US); Nigel G. Mills, Kettering, OH (US); Randall L. Redman, Beavercreek, OH (US); Kinred Bowling, Vandalia, OH (US)

(73) Assignee: Premark FEG L.L.C., Glenview, IL (US)

( * ) Notice: Subject to any disclaimer, the term of this patent is extended or adjusted under 35 U.S.C. 154(b) by 909 days.

(21) Appl. No.: 12/492,809

(22) Filed: Jun. 26, 2009

(65) Prior Publication Data
US 2010/0328702 A1 Dec. 30, 2010

(51) Int. Cl.
*H04Q 5/22* (2006.01)
*G06K 1/00* (2006.01)

(52) U.S. Cl.
USPC ............ 358/1.15; 400/76; 400/88; 235/375; 235/439; 235/470; 340/10.5; 340/572.1; 340/572.3; 340/572.7

(58) Field of Classification Search ............... 358/1.15; 235/470, 439, 375; 340/10.5, 572.1, 572.3, 340/572.7
See application file for complete search history.

(56) References Cited

U.S. PATENT DOCUMENTS

| | | | |
|---|---|---|---|
| 4,460,428 A * | 7/1984 | Teraoka | 156/360 |
| 4,598,780 A * | 7/1986 | Iwasaki et al. | 177/3 |
| 5,185,695 A | 2/1993 | Pruchnicki | |
| RE34,915 E | 4/1995 | Nichtberger et al. | |
| 5,560,718 A | 10/1996 | Furuya | |
| 6,409,401 B1 * | 6/2002 | Petteruti et al. | 400/88 |
| 6,547,040 B2 | 4/2003 | Goodwin | |
| 6,593,853 B1 | 7/2003 | Barrett et al. | |
| 6,899,476 B1 * | 5/2005 | Barrus et al. | 400/76 |
| 7,041,915 B2 | 5/2006 | Kasinoff | |
| 7,156,303 B1 | 1/2007 | Holzman | |
| 7,205,898 B2 * | 4/2007 | Dixon et al. | 340/572.1 |
| 7,230,580 B1 * | 6/2007 | Kelkar et al. | 343/870 |
| 7,311,251 B1 | 12/2007 | White | |
| 7,347,372 B1 * | 3/2008 | Goodwin, III | 235/462.25 |

(Continued)

FOREIGN PATENT DOCUMENTS

| | | |
|---|---|---|
| EP | 0087310 | 8/1983 |
| EP | 0837411 | 4/1998 |

(Continued)

OTHER PUBLICATIONS

Automatic identification is flying high; a report on the impact on manufacturing and distribution of automatic identification technology. Knill, Bernie, Industry Week, v234, pA1(23), Aug. 24, 1987.

(Continued)

*Primary Examiner* — King Poon
*Assistant Examiner* — Allen H Nguyen
(74) *Attorney, Agent, or Firm* — Thompson Hine LLP

(57) ABSTRACT

A label printer for handling labels with RFID tags includes one or more advantageous features such as locating an RF encoder unit antenna in position to read and/or write to label antennas after the label antennas have exited a label output slot of the printer, providing light elements to indicate status of a read and/or write operation to a label RFID tag or a voiding step to void labels when a read and/or write operation is unsuccessful.

12 Claims, 4 Drawing Sheets

U.S. PATENT DOCUMENTS

| | | | |
|---|---|---|---|
| 7,551,077 B2 * | 6/2009 | Raybuck et al. | 340/539.12 |
| 2001/0024157 A1 | 9/2001 | Hansmann | |
| 2002/0076683 A1 * | 6/2002 | Chen | 434/317 |
| 2003/0205412 A1 | 11/2003 | Hewitt | |
| 2006/0237546 A1 | 10/2006 | Lapstun | |
| 2008/0120193 A1 * | 5/2008 | Schuller et al. | 705/23 |
| 2008/0251009 A1 | 10/2008 | Nagai et al. | |
| 2009/0072019 A1 * | 3/2009 | Shibata et al. | 235/375 |
| 2010/0103238 A1 * | 4/2010 | Neuhard et al. | 347/109 |

FOREIGN PATENT DOCUMENTS

| | | |
|---|---|---|
| EP | 0853290 | 7/1998 |
| EP | 1248244 | 10/2002 |
| EP | 1854637 | 11/2007 |
| JP | 60193824 | 10/1985 |
| JP | 63144667 | 6/1988 |
| JP | 63178875 | 7/1988 |
| JP | 63191370 | 8/1988 |
| JP | 3138171 | 6/1991 |
| WO | WO 2005/004071 | 1/2005 |

OTHER PUBLICATIONS

PCT, International Search Report and Written Opinion, International Application No. PCT/US2010/038104 (Aug. 20, 2010).

PCT, International Preliminary Report on Patentability, PCT/US2010/038104 (Jan. 12, 2012).

* cited by examiner

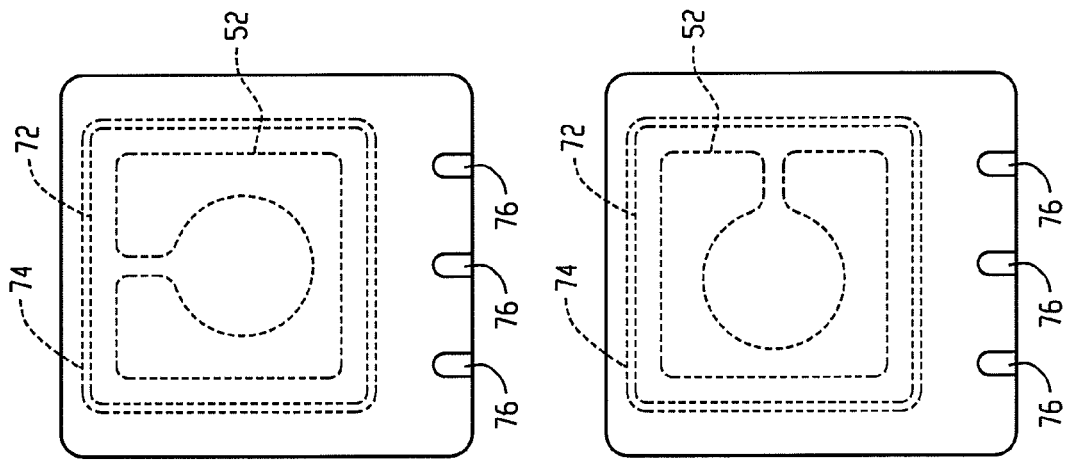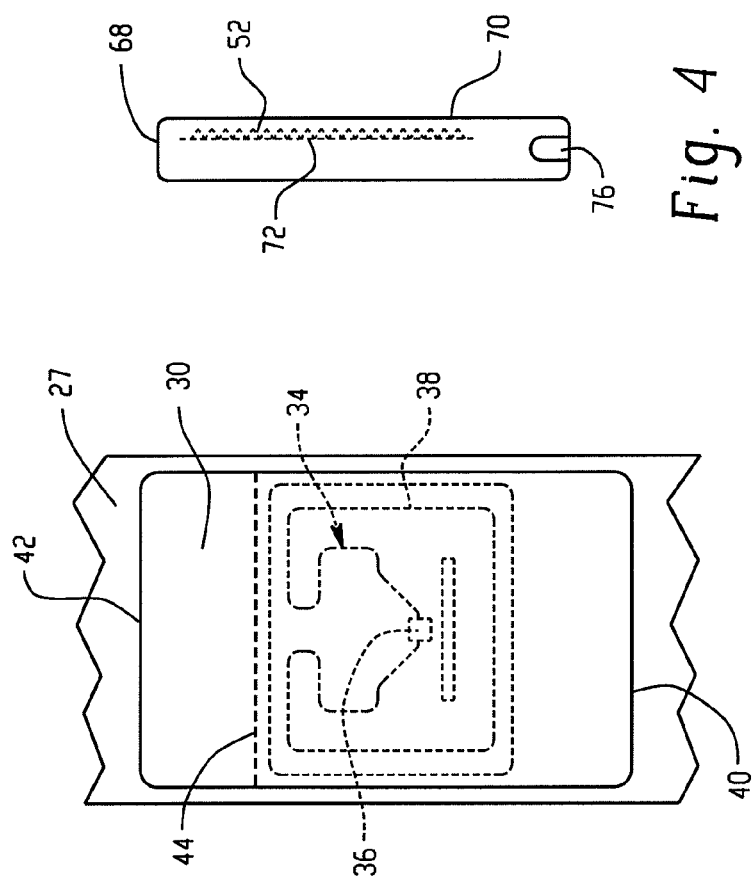

PRINTER AND SCALE FOR HANDLING RFID LABELS

TECHNICAL FIELD

This application relates generally to printers and scales of the type commonly used in groceries and supermarkets for weighing and/or pricing items in the nature of food products such as meats and produce and, more particularly, to printers and scales incorporating RFID label functionality.

BACKGROUND

Perishable food departments, such as deli departments in stores, commonly utilize slicers to slice food product and scales to weigh and print labels for the sliced food product. Scales are also used in conjunction with other food items. Currently the scales print labels with a bar code that can be scanned by a bar code scanner at checkout. With the development of RFID tags, there is a need for a printer and/or scale operable with such RFID tags. PCT International Publication No. WO 2005/004071 A1 discloses an exemplary scale operable with labels having RFID tags.

As RFID label technology improves and becomes more mainstream, there exists a need for improved RFID label compatible printers and scales that facilitate operation within an RFID label environment.

SUMMARY

In one aspect, a label printing mechanism for handling labels with associated RFID tags includes a housing, a label supply location within the housing and a label path extending from the label supply location to a label output slot of the housing. A print head is located within the housing along the label path for printing indicia on labels passing thereby. An RF unit is provided for reading and/or writing from and/or to label RFID tags on labels. The RF unit includes an antenna located in a position to be proximate to label RFID tag antennas that have exited the housing through the label output slot. A control is associated with the label printer and RF unit for operating the same.

In one implementation, the label printing mechanism takes the form of a scale including a weighing station located on the housing for receiving items to be weighed, and the control is associated with the weighing station for receiving weight information therefrom and is configured to calculate price for a weighed item and to effect printing of the price on a label by the label printer; and encoding, by the RF unit, of at least a serial number to an RFID tag of the label.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 3 is a partial view of an exemplary label supply;

FIG. 4 is a side elevation view of an RF encoder unit antenna housing structure;

FIGS. 5A and 5B show respective plan views of the antenna housing structure with two possible antenna board orientations;

DETAILED DESCRIPTION

Figure 1:
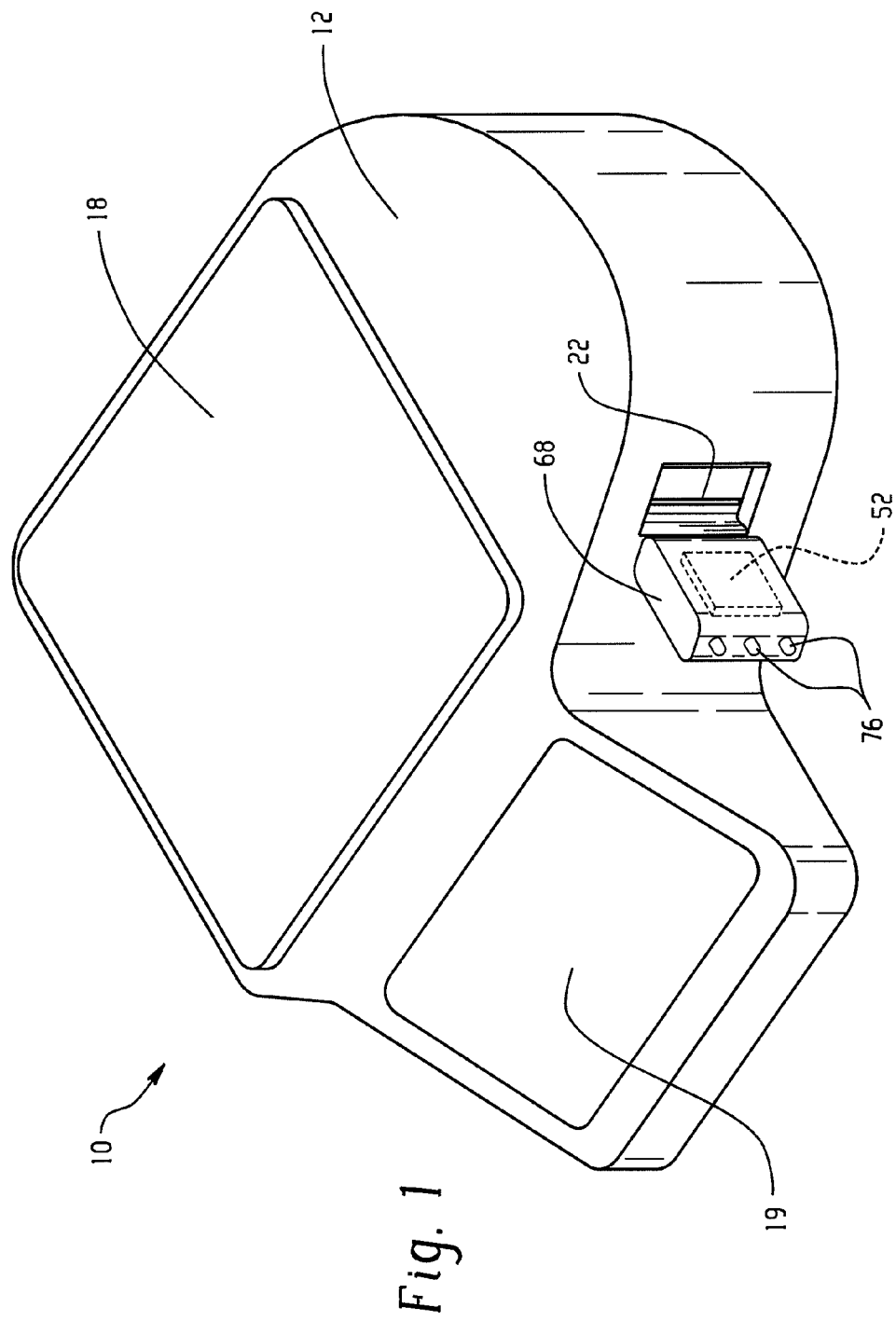
FIG. 1 is perspective view of one embodiment of a label printing mechanism in the form of a scale.
Figure 2A:
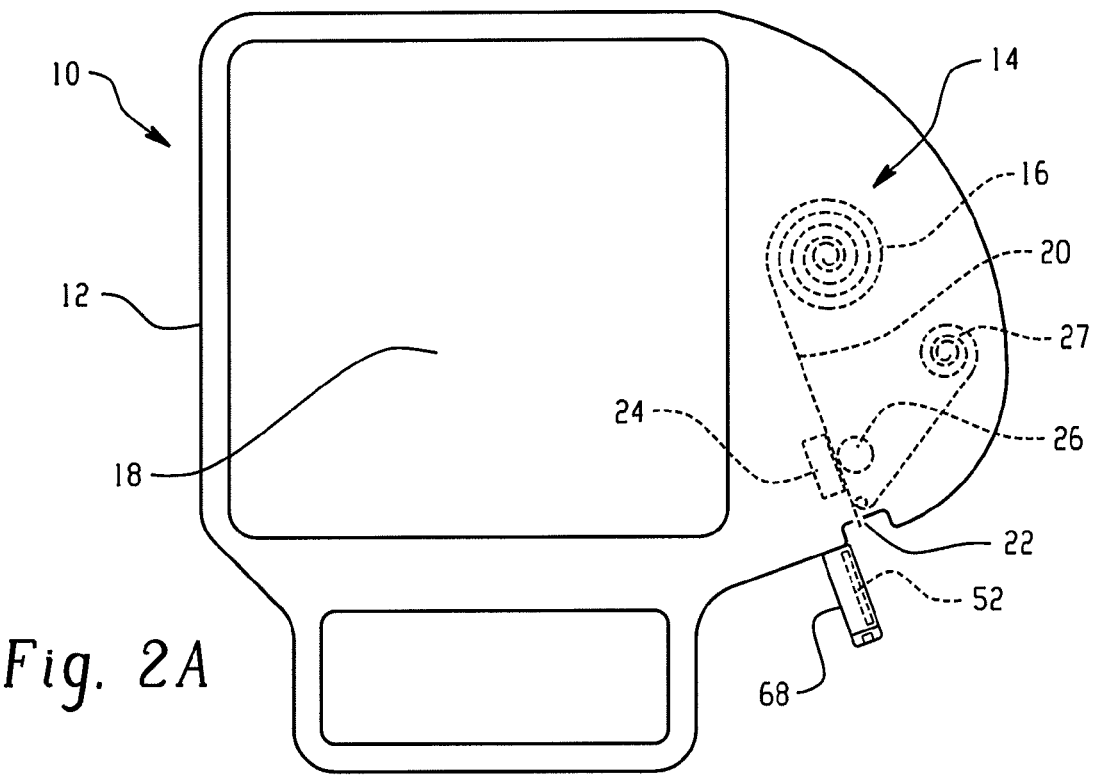
FIG. 2A is a schematic view of the scale of FIG. 1.
Figure 2B:
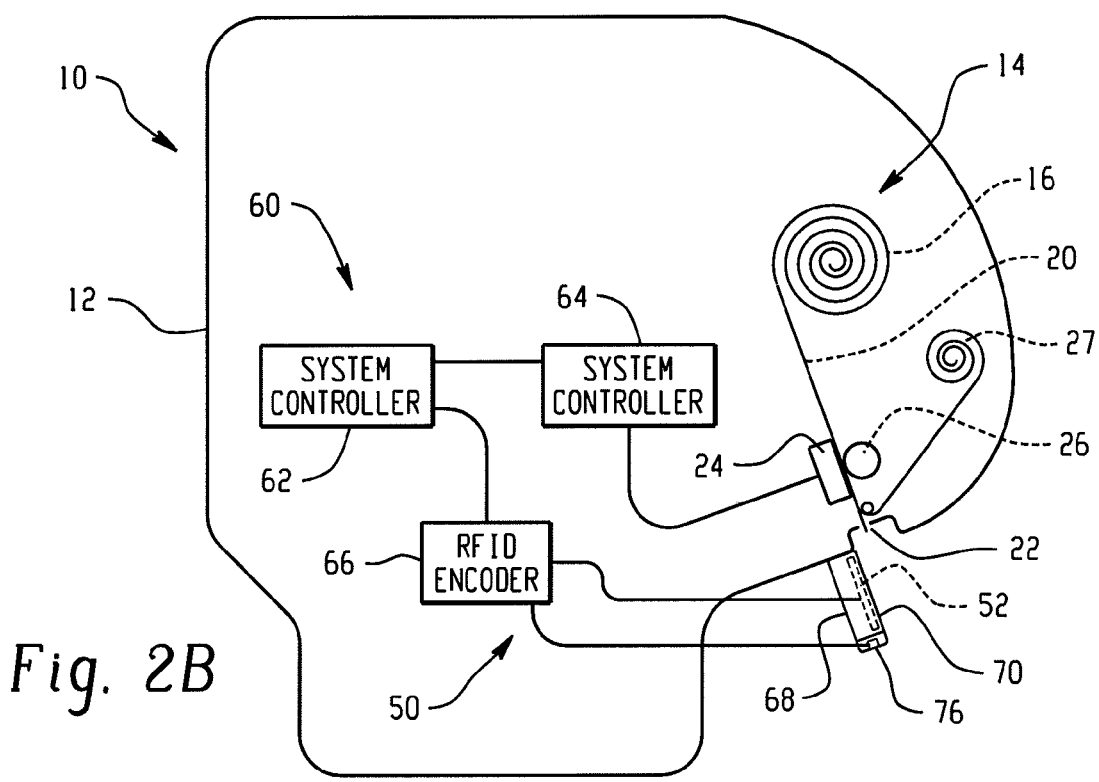
FIG. 2B is a schematic view of the control system of the scale of FIG. 1.

Referring to FIGS. 1, 2A and 2B, perspective and schematic views of one embodiment of a label printing mechanism in the form of a scale 10 is shown. The scale includes a housing 12 and a label supply location 14 within the housing for holding a supply of labels 16. A weighing station 18 is located on the housing for receiving items to be weighed. The weighing station is linked to an associated load cell that produces weight indicative signals. A user interface 19 (e.g., in the form of a touch screen display, array of buttons or other suitable form) is provided.

A label path 20 extends from the label supply location 14 to a label output slot 22 of the housing. A print head 24 and associated pressure roller 26, that acts as the label feed mechanism and drives the label stock, are located within the housing along the label path for printing indicia on labels passing thereby. After passing between the print head 24 and pressure roller 26, the label stock is passed sharply around a pin and the label is separated from the release liner and moves to the label output slot while the release liner travels to a take up roll location 27.

Referring to FIG. 3, the label supply may take the form of a roll of adhesive labels 30 on a release liner 32. Each label includes an associated RFID tag 32 thereon. Each RFID tag includes an RFID chip 36 connected to an antenna 38 (e.g., in the form of an inlay). The RFID tags, specifically the antennas, are generally planar and may be attached at the adhesive side of labels so as to be located adjacent the release surface of the release liner before the label is removed from the liner. The labels may be arranged in the scale such that edge 40 is the leading edge of the label and edge 42 is the trailing edge of the label. The label RFID tag is located a set distance from a trailing edge 42 of the label to facilitate desired positioning of the RFID tag antenna. In this manner, regardless of a length of the label being used, the RFID tag antenna will always be placed in a proper position for reading and/or writing if the label is fed out of the label output slot to a position where only a small portion of the trailing edge of the label is held between the print head 24 and pressure roller 26 as described in more detail below. The labels may include a side edge to side edge extending fold line 44 (e.g., in the form or a score or set of perforations) to facilitate folding of the label before applying it to a package.

Referring again to FIGS. 1, 2A and 2B, an RF encoder unit 50 for reading and/or writing from and/or to label RFID tags on labels is provided. The RF encoder unit 50 includes an antenna 52 located in a position to be proximate to label RFID tag antennas that have exited the housing 12 through the label output slot 22. A control 60 is associated with the label printer and RF unit. The illustrated control 60 includes a system controller 62 and printer controller 64, which may be located on a common board. The system controller 62 communicates with the control board 66 of the RF encoder, which is in turn connected to the antenna 52.

The control is also associated with the weighing station for receiving weight information. In one implementation, during a typical label production operation, the control calculates price for a weighed item and effects printing of the price on a label by the print head and encoding, by the RF unit, of at least the price and/or a serial number to an RFID tag of the label.

In the illustrated embodiment, the RF encoder unit antenna 52 is located external of the housing 12 and within a separate antenna housing structure 68 that includes a generally planar portion 70 located alongside the label exit path from the label output slot 22. As shown in FIG. 4, the RF encoder unit antenna 52 may be located on an antenna board 72 within the antenna housing 68. In one implementation, the antenna board is adapted to be rotated between at least a first orientation (FIG. 5A) for use in association with labels having one label antenna orientation and a second orientation (FIG. 5B) for use in association with labels having a different label antenna orientation. In this regard, the antenna board may be square and the antenna housing may include a square receiving area 74 for the antenna board to facilitate such rotation while maintaining proper placement of the board and antenna within the housing 68.

The housing may also incorporate one or more light elements 76 (e.g., in the form of LEDs) which are selectively energized to provide status indications to the scale operator. In the illustrated embodiment three different light elements (e.g., having respective colors of green, yellow and red) are provided. By way of example, one indicator light may (e.g., yellow) be energized for communicating a busy status of the RF encoder unit, another indicator light (e.g., green) may be energized for communicating a label ready status upon successful completion of a label read and/or write operation and the third indicator light (e.g., red) may be energized for communicating an error status when the label read and/or write operation has failed.

Figure 6:
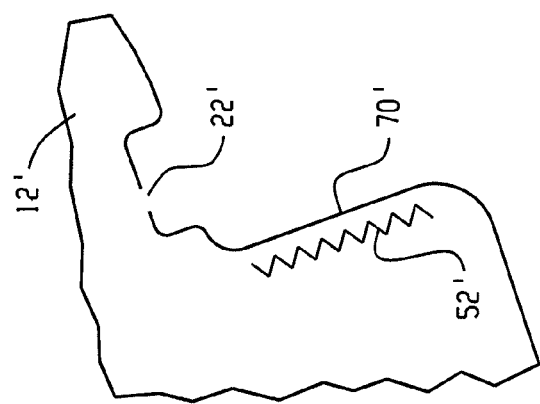
FIG. 6 is a partial view of a label printer embodiment incorporating the RF encoder unit antenna within the printer housing.

In an alternative embodiment shown in the partial schematic of FIG. 6, the scale housing 12' may include a generally planar portion 70' extending outwardly along one side of the label output slot 22', and the RF encoder unit antenna 52' may be located within the housing and adjacent the generally planar portion of the housing. In the case of either embodiment, the RF unit antenna should be located far enough from the label supply location within the housing to prevent inadvertent reading and/or writing to label RFID tags on labels within the housing.

Figure 7:
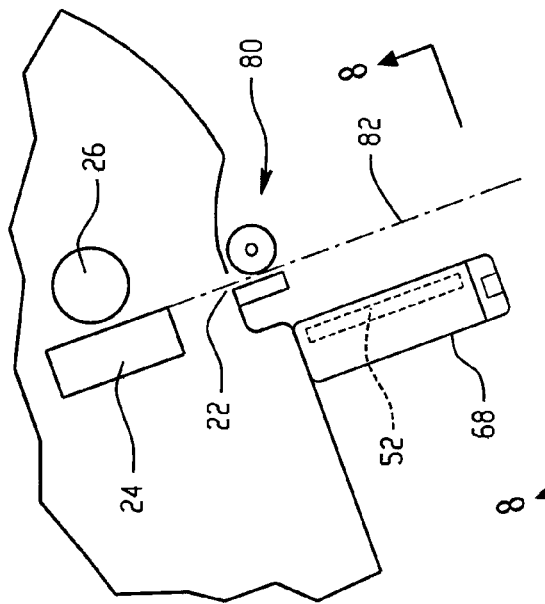
FIG. 7 is a partial schematic view of a corrugator mechanism located external of the label output slot.
Figure 8:
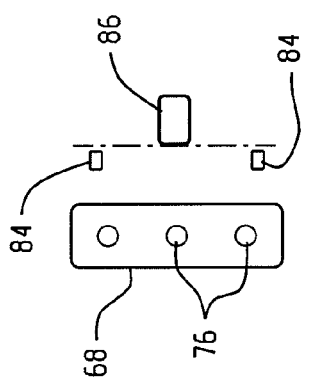
FIG. 8 is a partial elevation view along line 8-8 of FIG. 7.

Referring to FIGS. 7 and 8, a corrugator mechanism 80 is located at the external side of the label exit slot for placing a bend in the exiting label along a bend axis 82 that is parallel to a travel direction of the label as it exits. The bend prevents curling of the label away from the RF unit antenna 52. In the illustrated embodiment the corrugator includes spaced apart slides or guides 84 to one side of the label and a roller 86 to the opposite, adhesive side of the label. However, other corrugator configurations are possible.

During a label production operation, the control 60 may operate such that a printed label is partially fed out of the label exit opening 22 so as to place label RFID tag antenna 34 proximate the RF encoder unit antenna 52. In this position, a trailing edge of the label is held between the print head 24 and pressure roller 26 so as to prevent an operator from easily removing the label before a read and/or write operation is completed. Only after a label read and/or write operation by the RF encoder unit has been successfully completed does the control 60 effect completion of the label feed out (e.g., to a position such that no part of the label is held between the print head 24 and pressure roller 26).

An exemplary label production method using a label printer such as that described above involves producing a pricing label by moving a given label past the print head and printing product specific information on the label. In one implementation, label images may be produced and utilized for printing that include a no print region that aligns with the label RFID tag chip 36 to avoid poor print quality that can occur around the edges of the chip.

After printing, the given label is moved at least partially out of the label output slot and stopped to place an antenna of the RFID tag of the given label external of the label output slot and in field range of the antenna of the RF encoder unit. In one implementation, as previously mentioned, the given label is moved only partially out of the label output slot and is stopped. Then a read and/or write operation from and/or to the RFID tag of the given label is performed using the antenna of the RF encoder unit.

Upon successful completion of the reading and/or writing step, a first of the light elements is illuminated, and/or a first audible signal is produced, to indicate that the given label is ready to be applied to a package and, as appropriate, the label may be moved further out of the label output slot into a label ready position.

On the other hand, upon unsuccessful completion of the reading and/or writing step, a second of the light elements is illuminated, and/or a second audible signal is produced, to indicate that the reading and/or writing step failed. Additionally, upon unsuccessful completion of the reading and/or writing step, voiding of the given label may be achieved by printing a void indication on the given label. Subsequent to the voiding step, the label production steps may automatically be initiated in attempt to complete a successful label production operation. In one implementation, the voiding step includes moving the given label backward to the print head, printing the void indication and then outputting the given label. In another implementation the voiding step involves printing a void indication at the trailing edge of the label without moving the label backward.

Figure 9:
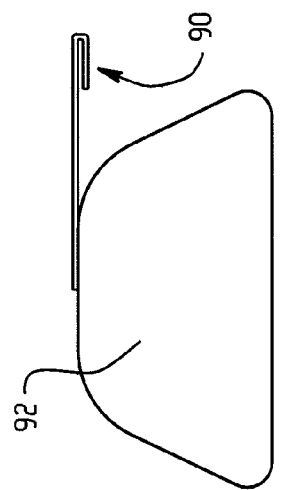
FIG. 9 is a side elevation view of a folded RFID tag label adhesively applied to a package.

Upon successful completion of the reading and/or writing step, the label is removed from the scale/printer and applied to a product. The application may be completed manually or using an automated label applier (e.g., such as that used in automated weighing and wrapping machines). Where the label is provided with a fold line that is located proximate to an edge of the antenna of the RFID tag, the label may be folded along the fold line to provide a non-adhesive label portion that encompasses a substantial portion of the antenna of the given label, and the folded label applied to the product such that the non-adhesive label portion extends freely from the product (e.g., see folded label portion 90 extending from product 92 in FIG. 9). By overhanging the label portion 90, which incorporates a substantial portion of the label antenna 34, the chance of product within the package (e.g., particularly high moisture content product) interfering with RF signal reaching the label antenna 34 (e.g., when attempting to read the label antenna 34 at a point-of-sale) is reduced.

Where the scale/label printer includes a label taken sensor (e.g., a reflective photosensor arrangement) the control 60 may maintain the green light element in an energized state until the label is removed, at which point the green light element may be deenergized.

It is to be clearly understood that the above description is intended by way of illustration and example only, is not intended to be taken by way of limitation, and that other changes and modifications are possible. For example, while a label printer incorporating a weighing station is primarily described, it is recognized that the various features could be incorporated into a label printer that does not include a weighing station.

What is claimed is:

1. A label printing mechanism for handling labels with associated RFID tags, the mechanism comprising:
   a housing;
   a label supply location within the housing;
   a label path extending from the label supply location to a label output slot of the housing;
   a print head located within the housing along the label path for printing indicia on labels passing thereby;
   an RF unit for reading and/or writing from and/or to label RFID tags on labels, the RF unit including an antenna located in a position to be proximate to label RFID tag antennas that have exited the housing through the label output slot; and
   a control associated with the label printer and RF unit for operation thereof;
   a corrugator mechanism located external of the label output slot for placing a bend in the given label along a bend axis that is parallel to a travel direction of the given label as it exits so as to prevent curling of the label away from the RF unit antenna.

2. The label printing mechanism of claim 1 wherein the RF unit antenna is located far enough from the label supply location within the housing to prevent inadvertent reading and/or writing to label RFID tags on labels within the housing.

3. The label printing mechanism of claim 1, further comprising:
   a label feed mechanism;
   wherein the control is associated with the label feed mechanism and configured to effect partial feed out labels so as to place and stop label RFID tag antennas proximate the RF unit antenna and to thereafter effect reading and/or writing from and/or to label RFID tags on labels.

4. The label printing mechanism of claim 3 wherein the control is configured to effect completion of label feed out after a label read and/or write operation by the RF unit has been successfully completed.

5. The label printing mechanism of claim 3 wherein the RF unit includes at least one indicator light for communicating status of a label read and/or write operation.

6. The label printing mechanism of claim 5 wherein the RF unit includes a first indicator light for communicating a busy status of the RF unit, a second indicator light for communicating a label ready status upon successful completion of the label read and/or write operation and a third indicator light for communicating an error status when the label read and/or write operation has failed.

7. The label printing mechanism of claim 5 wherein the RF unit antenna is located within an antenna housing that is distinct form the housing of the printer, the indicator light is also located within the antenna housing, the antenna housing configured to permit light from the indicator light to be visible from external the antenna housing structure.

8. The label printing mechanism of claim 1 wherein the RF unit antenna is located within an antenna housing, the RF unit antenna is located on an antenna board within the antenna housing, the antenna board adapted to be rotated between at least a first orientation for use in association with labels having one label antenna orientation and a second orientation for use in association with labels having a different label antenna orientation.

9. The label printing mechanism of claim 8 wherein the antenna board is square and the antenna housing includes a square receiving area for the antenna board.

10. A scale incorporating the label printing mechanism of claim 1 and further comprising:
    a weighing station located on the housing for receiving items to be weighed;
    the control associated with the weighing station for receiving weight information therefrom;
    the control configured to calculate price for a weighed item and to effect:
      (i) printing of the price on a label by the label printer;
      (ii) encoding, by the RF unit, of at least the price and/or a serial number to an RFID tag of the label.

11. The scale of claim 10 wherein a supply of labels is located at the label supply location, each label of the supply of labels has a label RFID tag located a set distance from a trailing edge of the label.

12. A label printing mechanism for handling labels with associated RFID tags, the mechanism comprising:
    a housing;
    a label supply location within the housing;
    a label path extending from the label supply location to a label output slot of the housing;
    a print head located within the housing along the label path for printing indicia on labels passing thereby;
    an RF unit for reading and/or writing from and/or to label RFID tags on labels, the RF unit including an antenna located in a position to be proximate to label RFID tag antennas that have exited the housing through the label output slot; and
    a control associated with the label printer and RF unit for operation thereof;
    wherein the RF unit antenna is located external of the housing;
    wherein the RF unit antenna is located within an antenna housing that has a generally planar surface located parallel to an exit path of the given label, the RF unit antenna lying generally in a plane parallel to the generally planar surface.

* * * * *